(12) United States Patent
DeVos (10) Patent No.: US 6,406,624 B1
(45) Date of Patent: Jun. 18, 2002

(54) FLOCCULATION APPARATUS AND APPARATUS FOR FLOATING UPWARDLY IN A LIQUID AND FOR MOVING DOWNWARDLY IN THE LIQUID UNDER THE INFLUENCE OF GRAVITY

(76) Inventor: Jerry J. DeVos, 99 Stoney Brook Rd., Towaco, NJ (US) 07082

( * ) Notice: Subject to any disclaimer, the term of this patent is extended or adjusted under 35 U.S.C. 154(b) by 0 days.

(21) Appl. No.: 09/716,520

(22) Filed: Nov. 20, 2000

(51) Int. Cl.[7] .......................... B01D 21/08; B01F 11/00
(52) U.S. Cl. ................... 210/208; 210/219; 210/242.1; 366/102; 366/332; 441/22; 441/29
(58) Field of Search ................. 210/208, 219, 210/242.1, 121; 441/22, 29; 366/102, 103, 332, 334, 335

(56) References Cited

U.S. PATENT DOCUMENTS

| | | | |
|---|---|---|---|
| 2,081,851 A | | 5/1937 | Darby et al. ................. 210/16 |
| 2,087,851 A | * | 7/1937 | Darby ......................... 210/208 |
| 2,277,890 A | | 3/1942 | Steindorf ....................... 259/9 |
| 2,499,816 A | | 3/1950 | Carter ......................... 259/27 |
| 2,596,082 A | * | 5/1952 | Stuart ......................... 366/332 |
| 2,715,099 A | * | 8/1955 | Stuart ......................... 366/102 |
| 3,015,476 A | | 1/1962 | Stuart ......................... 259/141 |
| 3,303,932 A | * | 2/1967 | Hirs et al. ............... 210/242.1 |
| 3,806,098 A | * | 4/1974 | Clough ....................... 366/102 |
| 3,941,695 A | | 3/1976 | Harris ......................... 210/49 |
| 5,160,041 A | | 11/1992 | Taniguchi et al. .......... 210/205 |
| 5,605,653 A | | 2/1997 | DeVos ......................... 261/77 |
| 5,762,418 A | * | 6/1998 | Van Drie .................... 366/332 |
| 5,863,441 A | | 1/1999 | Krofta ........................ 210/703 |
| 6,036,357 A | * | 3/2000 | Van Drie .................... 366/332 |

* cited by examiner

Primary Examiner—Christopher Upton
(74) Attorney, Agent, or Firm—Moser, Patterson & Sheridan, LLP (57) ABSTRACT

Flocculation apparatus and flotation apparatus useful in flocculation apparatus for floating paddles upwardly and allowing gravity to move paddles downwardly through a liquid to agglomerate particles suspended in the liquid.

25 Claims, 11 Drawing Sheets

FLOCCULATION APPARATUS AND APPARATUS FOR FLOATING UPWARDLY IN A LIQUID AND FOR MOVING DOWNWARDLY IN THE LIQUID UNDER THE INFLUENCE OF GRAVITY

BACKGROUND OF THE INVENTION

This invention relates to flocculation apparatus and to apparatus for floating upwardly in a liquid and for moving downwardly in the liquid under the influence of gravity.

By way of example, and to provide a background for the flocculation apparatus of the present invention, the processing of water to provide a supply of drinking water is a well developed technology. Typically with surface water supply systems, there is a multi-stage process for removing contaminants. Typically, the process first includes the stage of removing coarse debris from the water by screens or other mechanisms. This stage is typically followed by the several stages of conventional surface water treatment. In the first stage, chemicals are introduced into the water to separate particulate matter from the water. This stage is typically performed by the addition of chemicals to the water and then dispersion through rapid mixing. This stage is typically followed by flocculation to agglomerate the solid particles and this stage is typically followed by separation and removal of the solid particles by gravity in a sedimentation basin.

Mechanical devices have been employed for nearly 100 years in flocculator basins in municipal drinking water treatment plants. Different types of flocculator mechanisms have been typically employed.

The first type of mechanism has been a mechanically driven mechanism consisting of a series of wood, fiberglass or steel paddles. These paddles are powered in a circular, unidirectional motion through the water via a submerged "reel" arrangement with a horizontal rotating shaft submerged in the basin. Radiating from the shaft is a steel structure which supports the paddles that rotate in a circular motion. In this mechanism, the shaft of the paddle mechanism is supported by a series of bearings which are submerged in the water. The drive unit is often non-submerged and is located in a dry well at the end of the basin or via a top mounted drive above the liquid level. This technology is widely used in water treatment plants.

Other types of circular mechanisms are also employed. These typically consist of paddles rotating in a circular, uni-directional motion mounted on a vertical shaft or turbine flocculators operating on the vertical shaft.

The above-noted flocculator mechanisms require either submerged bearings or a large number of drive units to accommodate flocculation in a basin.

Other types of flocculation mechanisms of a non-circular, bi-directional design, i.e., oscillating flocculators, are also known. The two types of these devices principally used are the Walking Beam flocculator and Floscillator. In both of these mechanisms, the paddles move in non-circular, linear motion, either up and down or back and forth in the flocculation basin. The principal advantage to this type of device is that it provides superior flocculation at a lower horsepower per unit volume input than circular mechanisms, and the mechanism can be designed without the use of submerged bearings for moving parts in the water other than the paddles. These designs are widely accepted and have been used in the United States municipal drinking water market for nearly 50 years. The principal disadvantage of these types of designs is that although these designs provide effective flocculation, they are expensive to manufacture due to the reciprocating movement that provides high torsional stresses to the components.

Accordingly, there is a need in the art for new and improved flocculation apparatus overcoming the above-noted disadvantages associated with prior art flocculation apparatus.

Numerous flotation apparatus are known to the art for the floating upwardly in a liquid and for moving downwardly in a liquid. However, it is believed that there is a need in the art for new and improved floatation apparatus which are useful in flocculation apparatus as well as in other applications.

SUMMARY OF THE INVENTION

It is the object of the present invention to satisfy the above needs in the art.

Flocculation apparatus satisfying such need and embodying the present invention may include paddle apparatus for being moved upwardly and downwardly through a liquid in which particles are suspended to facilitate agglomeration of the particles, flotation apparatus and compressed gas discharge apparatus for alternately and continuously moving the paddle apparatus upwardly and downwardly through the liquid in response to compressed gas being introduced continuously into the flotation apparatus and wherein the flotation apparatus are for continuously receiving the compressed gas and in response thereto for floating and moving the paddle apparatus upwardly through the liquid after which the compressed gas discharge apparatus are for discharging the compressed gas from the flotation apparatus to allow gravity to pull the paddle apparatus downwardly through the liquid, and which flocculation apparatus may further include a compressed gas supply for continuously introducing compressed gas into the flotation apparatus.

Flotation apparatus satisfying the foregoing need and embodying the present invention may include combination flotation and compressed gas discharge apparatus for receiving compressed gas and in response to sufficient compressed gas being received therein for becoming sufficiently buoyant to float upwardly in the liquid, and upon such combination flotation and compressed gas discharge apparatus floating sufficiently high in the liquid such combination apparatus automatically discharge sufficient of the compressed gas to cause the combination apparatus to lose sufficient buoyancy to permit gravity to pull the combination apparatus downwardly through the liquid.

DESCRIPTION OF THE DRAWINGS

FIGS. 6–9 are sequential views illustrating the various stages of the upward flotation of the floatation and gas discharge apparatus and paddle apparatus of the present invention, FIG. 6 illustrates the lowermost position, FIG. 9 illustrates the uppermost position, and FIGS. 7 and 8 illustrate intermediate positions.

DETAILED DESCRIPTION OF THE INVENTION

Figure 1:
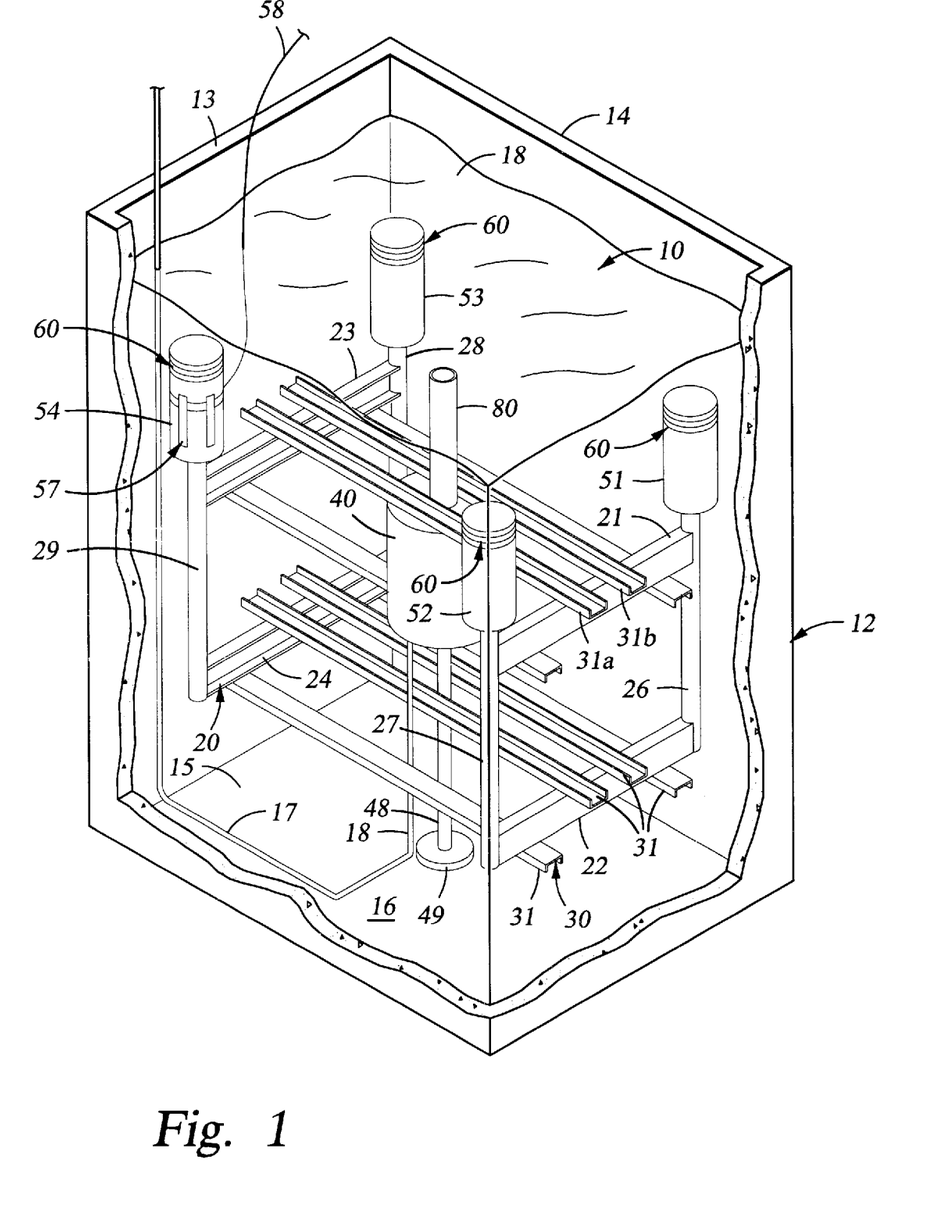
FIG. 1 is a partially open, perspective view illustrating the flocculation apparatus of the present invention shown residing in a flocculation basin.

Referring to FIG. 1, there is shown flocculation apparatus embodying the present invention and indicated by general numerical designation 10. In FIG. 1, flocculation apparatus 10 is shown residing in a flocculation basin indicated by general numerical designation 12 and which flocculation basin includes four walls, only walls 13 and 14 being shown in FIG. 1, and a basin bottom 15. The walls and bottom of the flocculation basin 12 provide a chamber indicated by general numerical designation 16 for receiving liquid, indicated by general numerical designation 18, in which flocculatable or settleable particles (not shown) are suspended.

Referring further to FIG. 1, the flocculation apparatus 10 of the present invention includes frame apparatus indicated by general numerical designation 20, paddle apparatus indicated by general numerical designation 30 and floatation and compressed gas discharge apparatus indicated by general numerical designation 40.

The frame apparatus 20 includes a plurality of horizontally disposed frame members 21 . . . 24 and the paddle apparatus 30 includes a plurality of horizontally disposed paddle members 31 mounted suitably to the frame members 21 . . . 24 as illustrated in FIG. 1. The frame members 21 . . . 24 may be made, for example, of stainless steel and the paddle members 31 may be made of, for example, stainless steel, carbon steel, fiberglass or wood. Upon the frame members and the paddle members being made of stainless steel, the paddle members may be suitably mounted to the frame members, for example, by welding. Upon the frame members being made of stainless steel and the paddle members being made of fiberglass or wood, the paddle members may be mounted suitably to the frame members by suitable bolts or clamps not shown.

Referring still further to FIG. 1, it will be understood that the flotation and compressed gas discharge apparatus 40, for example, may be mounted suitably and directly to the two paddle members 31a and 31b. More particularly, it will be understood that upon the portion of the flotation and compressed gas discharge apparatus 40 shown in FIG. 1 being made of stainless steel and upon the paddle members 31A and 31B being made of stainless steel, the flotation and compressed gas discharge apparatus 40 may be welded to the paddle members 31A and 31B. Upon the portion of the flotation and compressed gas discharge apparatus 40 shown in FIG. 1 being made of stainless steel, and upon the paddle members 31A and 31B being made of fiberglass or wood, the flotation and compressed gas discharge apparatus 40 may be mounted to such fiberglass or wood paddle members by suitable bolts or clamps not shown. Accordingly, it will be understood, that due to such mounting the flotation and compressed gas discharge apparatus 40, paddle apparatus 30 and frame apparatus 20 move in unison upwardly and downwardly in the flocculation basin 12. Accordingly, it will be understood that since the paddle members 31 are mechanically interconnected by the frame members 21 . . . 24, all paddle members move upwardly and downwardly together, at the same velocity, and a uniform spacing is maintained between all paddle members.

Figure 3:
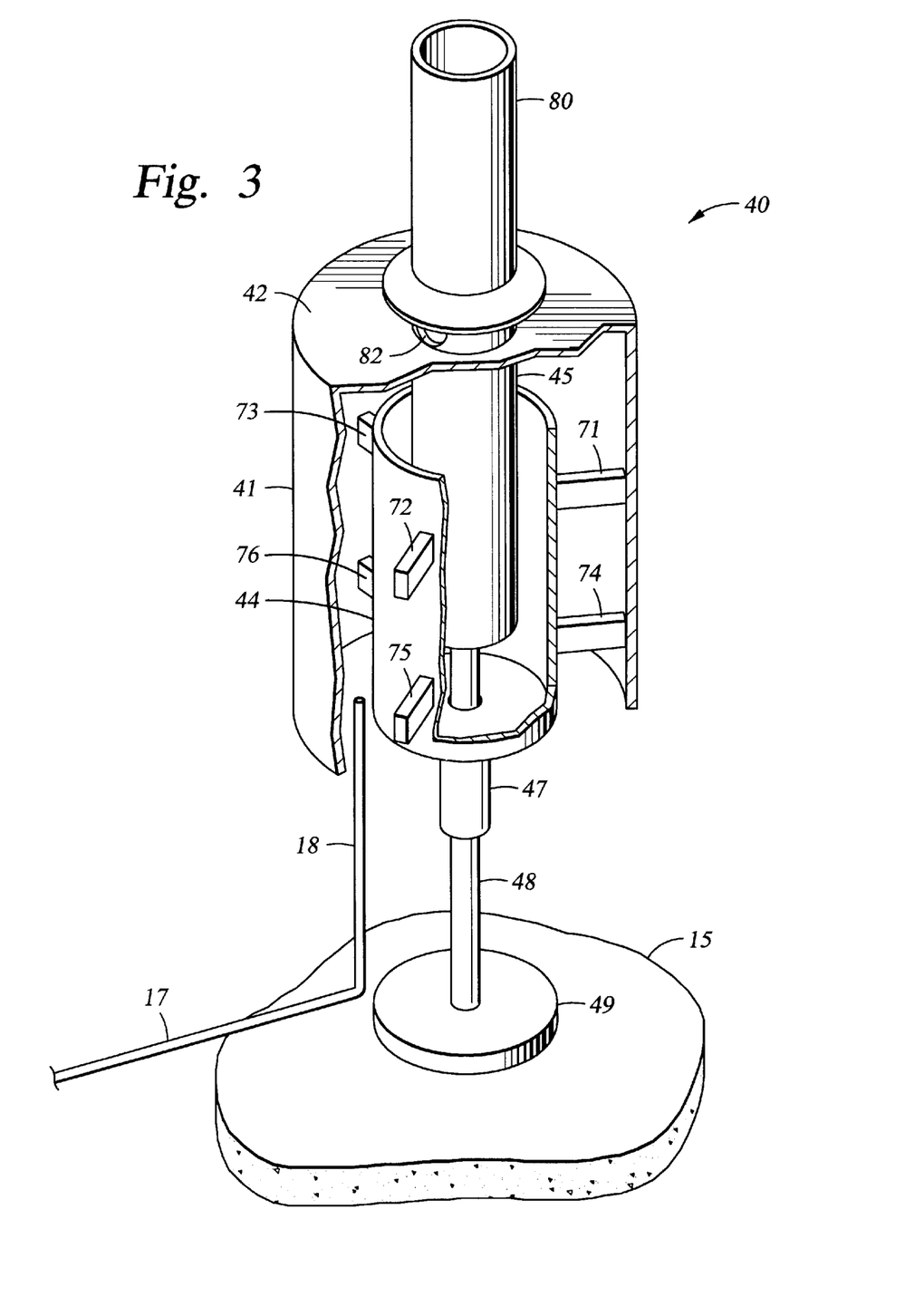
FIG. 3 is a perspective, schematical illustration of the flotation and compressed gas discharge apparatus of the present invention.
Figure 4:
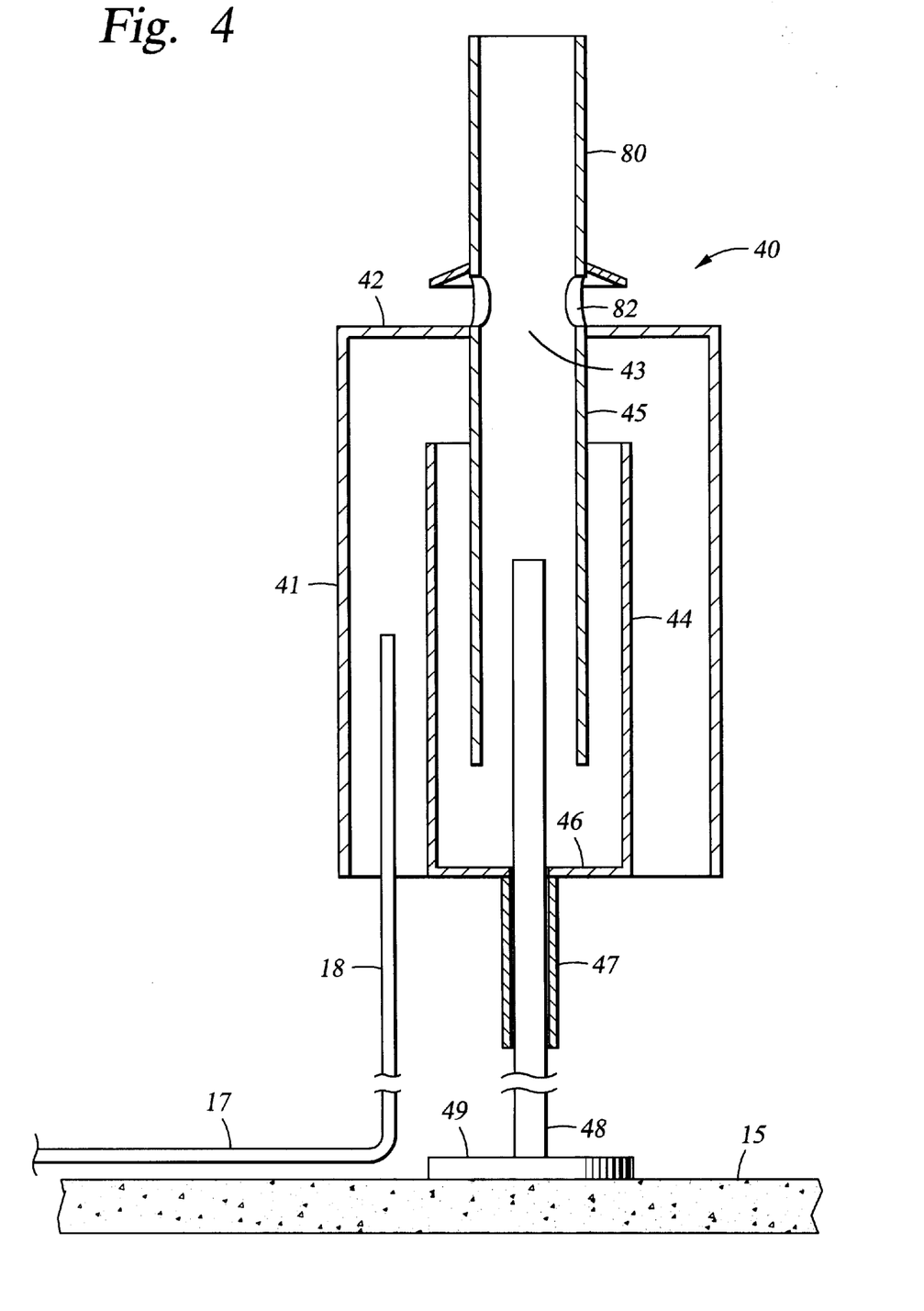
FIG. 4 is a vertical diagrammatical illustration of the flotation and compressed discharge apparatus of the present invention.

The flocculation apparatus 10, illustrated in FIG. 1, may further include a pressurized or compressed air line 17 including a branch line 18 extending upwardly into the flotation and compressed gas discharge apparatus 40 as illustrated in detail in FIGS. 3 and 4; the pressurized or compressed air line 17 is connected to a suitable source of pressurized or compressed air (not shown). The pressurized or compressed air line 17 may be mounted suitably to the basin wall 13 and bottom 15, for example, by suitable clamps not shown. It will be,generally understood, from FIG. 1, and described in detail below, that the pressurized or compressed air lines 17 and 18 continuously supply or introduce compressed air into the flotation and compressed gas discharge apparatus 40 causing the apparatus 40 to become increasingly buoyant and float upwardly in the liquid 18 contained in the flocculation basin 12 thereby moving the paddle apparatus 30 and the frame apparatus 20 upwardly in the liquid 18 due to their mechanical interconnection with the apparatus 40 until, and as is also described in detail below, the flotation and compressed gas discharge apparatus 40 discharge, i.e., automatically discharge, the compressed air from the apparatus 40 whereupon the apparatus 40 and the frame apparatus 20 and paddle apparatus 30 are pulled downwardly in the liquid 18 by gravity. During such upward and downward movement of the paddle members 31 of the paddle apparatus 30, the paddle members agitate or stir the liquid 18 contained in the flocculation basin 12 thereby agitating the particles suspended in the liquid facilitating, or causing the particles to flocculate or agglomerate.

Figure 2:
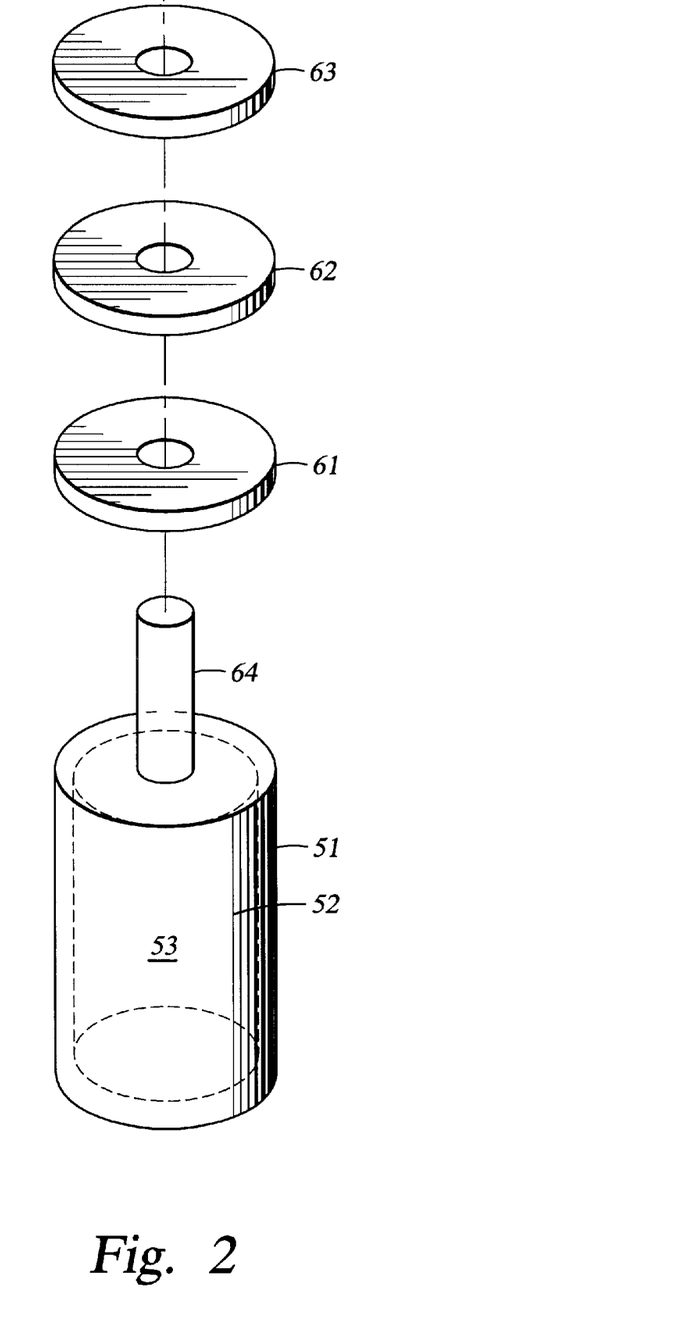
FIG. 2 is an exploded view of a representative ballast member and a plurality of trim rings.

As is further illustrated in FIG. 1, the frame apparatus 20 of the present invention may further include frame rods 26 . . . 29 and may still further include ballast members 51 . . . 54 mounted suitably and respectively to the tops of the frame rods 26 . . . 29. The frame rods may be made of, for example, stainless steel and the ballast members may be made of, for example, stainless steel and mounted suitably at the tops of the frame rods such as by welding. A representative ballast member 51 is shown in FIG. 2. Representative ballast member 51 may comprise a hollow container 52 made of, for example, the above-noted stainless steel providing a hollow interior or sealed chamber 53. The sealed chamber 53 of the representative ballast member 51, FIG. 2, contains, for example, compressed air, concrete, steel or other material depending upon the buoyancy characteristic of the material of which the paddle members 31 (FIG. 1) are made. For example, upon the paddle members 31 being made of stainless steel, the sealed chamber 53 will be filled with compressed air to increase the buoyancy of the flocculation apparatus 10, particularly the buoyancy of the stainless steel paddle members 31, and, upon the paddles 31 being made of wood, the sealed chamber 53 would typically be filled with concrete to reduce the buoyancy of the flocculation apparatus, particularly the inherent buoyancy of the wood paddle members 31. Accordingly, it will be understood that the ballast members 51 . . . 54 vary or adjust the buoyancy of the flocculation apparatus 10, principally the buoyancy of the paddle members 31, depending upon the buoyancy characteristics of the material of which the paddle members 31 are made. It will be further understood that the principal significance of the ballast members is their displacement volume and not the density of the material they contain.

Referring again to FIG. 1, and to ballast member 54, upon the flocculation apparatus 10 of the present invention operating, for example, outdoors in the winter time, or in a cold climate, to prevent icing, the ballast members, note representative ballast member 54 in FIG. 1, may be provided with electrically conductive heating elements, sometimes referred to in the art as heat tracings, which are shown diagrammatically in FIG. 1 and indicated by general numerical designation 54. The heat tracings 54 are connected by the electrical conductor 58 to a suitable source of electrical energy not shown.

It will be further understood from FIGS. 1 and 2 that the flocculation apparatus 10 of the present invention may further include four trim apparatus, each indicated by general numerical designation 60 in FIG. 1, for trimming the upward and downward movement of the flocculation apparatus 10 in the flocculation basin 12 to cause the apparatus 10 to remain horizontal, or at least substantially horizontal, during its upward and downward movement in the flocculation basin 12. Such trim apparatus may embodied as a plurality of trim rings such as representative trim rings 61 . . . 63 shown in FIG. 2. Trim rings 61 . . . 63 are a plurality of annular members which may be stacked vertically on a stack rod 64 extending vertically upward from the representative ballast member 51. Depending upon the trimming requirements, one or more of the trim rings 61 . . . 63 may be stacked on the ballast member. The trim rings 61 . . . 63, FIG. 2, may be made, depending upon trimming requirements, of concrete, stainless steel or other suitable material.

Referring to the detailed structure of the flotation and compressed gas discharge apparatus 40, this apparatus is illustrated in perspective and in schematical form in FIG. 3 and is illustrated diagrammatically in vertical cross-section in FIG. 4. Referring to FIGS. 3 and 4, and particularly to FIG. 4, apparatus 40 may include flotation apparatus comprising a first hollow cylinder 41 having an open bottom and a generally closed top 42 provided with a generally centrally formed opening 43. Apparatus 40 may further include compressed gas discharge apparatus comprising a second hollow cylinder 44 and a third hollow cylinder 45. The second hollow cylinder 44 may be provided with an open top, as best seen in FIG. 4, and a generally closed bottom 46 as seen in FIG. 4 and which closed bottom 46 may be provided with a cylindrical sleeve 47 which may be formed integrally with, or suitably mounted to, the second hollow cylinder bottom 46. As will be best understood from FIG. 4, the sleeve 47 is for slidably receiving a guide rod 48 mounted suitably to the flocculation basin floor 15 and extending upwardly therefrom; as illustrated in FIGS. 1, 3 and 4, the guide rod 48 may be mounted suitably to the basin bottom 15 by a suitable mounting member 49. As will be understood from FIGS. 1 and 4, the sliding interconnection between the guide rod 48 and the sleeve 47 permits the flotation and compressed gas apparatus 40 to slide or move upwardly and downwardly on the guide rod 48 which positions the flotation and gas discharge means 40, and thereby the entire flocculation apparatus 10 including the paddle apparatus 20 and the frame apparatus 30, generally centrally of the flocculation basin 12 and in particular prevents the paddle apparatus 30 and the frame apparatus 20 from engaging or striking the walls of the flocculation basin 12.during the upward and downward movement of the flocculation apparatus in the flocculation basin 12.

Referring again to FIGS. 3 and 4, second hollow cylinder 44 resides interiorly of and is spaced inwardly from the first hollow cylinder 41 and may be mounted to the first hollow cylinder 41, for example, by two pluralities of vertically displaced connecting members or supports 71, 72 and 73 and 74, 75 and 76 shown in FIG. 3. As will be best understood from FIG. 4, the upper open portion of the second hollow cylinder 44 places the interior of the first hollow cylinder 41 and the interior of the second hollow cylinder 44 in fluid communication. As will be best understood from FIG. 4, the third hollow cylinder 45 has an open top and an open bottom and resides generally interiorly of and spaced from the second hollow cylinder 44. The upper portion of the third hollow cylinder 45 is mounted and sealed to the underside of the top 42 of the first hollow cylinder 44 surrounding or coincident with the central opening 43 formed in the generally closed top 42 of the first hollow cylinder 41. It will be further noted from FIG. 4 that the open bottom of the third hollow cylinder 45 places the interior of the third hollow cylinder 45 in fluid communication with the interior of the second hollow cylinder 44 whereby the interiors of all three hollow cylinders, 41, 44 and 45, are in fluid communication. The hollow cylinders 41, 44 and 45 may be made of stainless steel and suitably mounted to each other as described above, such as by welding.

It will be understood that the term hollow cylinder as used herein and in the appended claims is used to mean an elongated, hollow member either circular or rectangular in cross-section as viewed in a plane perpendicular to the axis of the elongated hollow member. Accordingly, it will be further understood that the term width as used herein and in the appended claims is used to mean either the diameter of a circular in cross-section elongated hollow member or the width of a rectangular in cross-section elongated hollow member.

In one embodiment, the first hollow cylinder 41, the second hollow cylinder 44, and the third hollow cylinder 45 were circular in cross-section and in another embodiment the first hollow cylinder 41 and the second hollow cylinder 44 were rectangular in cross-section and the third hollow cylinder 45 was circular in cross-section.

Referring further to FIGS. 3 and 4, and in particular to FIG. 4, it will be understood that the height and width of the second hollow cylinder 44 are less than the height and width of the first hollow cylinder 41 and that the width of the third hollow cylinder 45 is less than the width of the second hollow cylinder 44.

Referring still further to FIGS. 3 and 4, it will be understood that the flotation and compressed gas discharge apparatus 40 may further include a gas discharge pipe 80 which is sometimes referred to in the art as a stilling pipe. The gas discharge pipe 80 extends vertically upwardly from the generally closed top 42 of the first hollow cylinder 41, may be made of stainless steel, and may be suitably mounted to the top 42 of the first hollow cylinder 41 surrounding, or coincident with, the generally centrally formed opening 43 formed in the first hollow cylinder top 42, such as by welding. As will be understood schematically from FIG. 3, and diagrammatically from FIG. 4, the lower portion of the gas discharge pipe 80 is provided with an opening 82 which places the exterior of the first hollow cylinder 41 in fluid communication with the interiors of the third hollow cylinder 45, the second hollow cylinder 44 and the first hollow cylinder 41.

Figure 5:
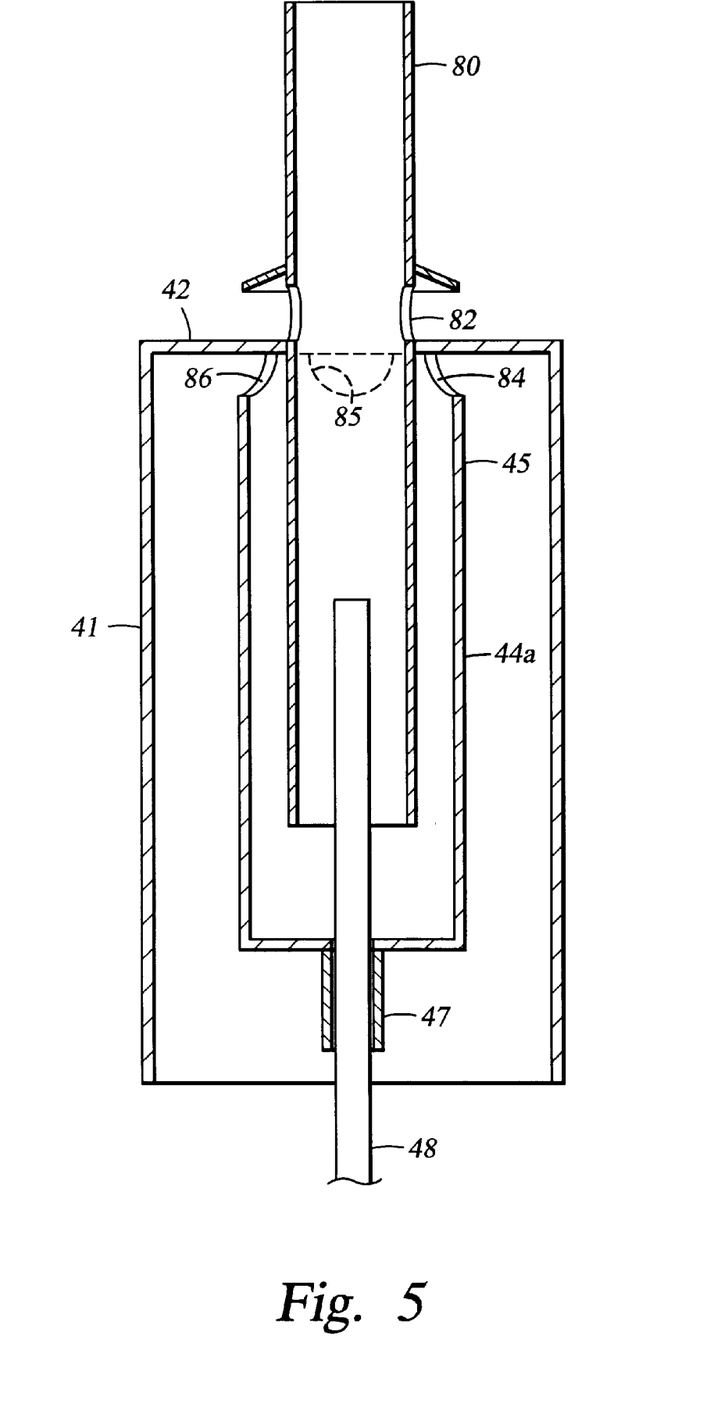
FIG. 5 is a diagrammatical vertical cross-sectional view of an alternate embodiment of the flotation and compressed gas discharge apparatus of the present invention.

Referring to FIG. 5., an alternate embodiment of the flotation and compressed gas apparatus 40 is shown in diagrammatical vertical cross-section in FIG. 5. This embodiment is the same as the earlier embodiment shown in FIGS. 3 and 4 except that in this embodiment the top portion of the second hollow cylinder 44A is mounted to, such as by welding, the underside of the top 42 of the first hollow cylinder 44. As will be understood from FIG. 5, the upper portion of the second hollow cylinder 45 is provided with a plurality of openings 84, 85 and 86 for placing the interiors of the second hollow cylinder 45 and the first hollow cylinder 44 in fluid communication.

Referring now to the sequential illustrations of FIGS. 6–9, one flotation cycle of the flocculation apparatus 10 of the present invention is illustrated. It will be understood that for purposes of this illustration only the flotation and compressed discharge apparatus 40, paddle apparatus 30 and a representative ballast member 51 comprising the flocculation apparatus 10 are shown for purposes of simplicity and clarity of presentation. It will be understood that pressurized or compressed air is introduced continuously through the line 18 into the first hollow cylinder 41 during the operation of the flocculation apparatus 10 of the present invention. It will be further understood that such compressed air is identified diagrammatically in these FIGURES in cross-section.

Figure 6:
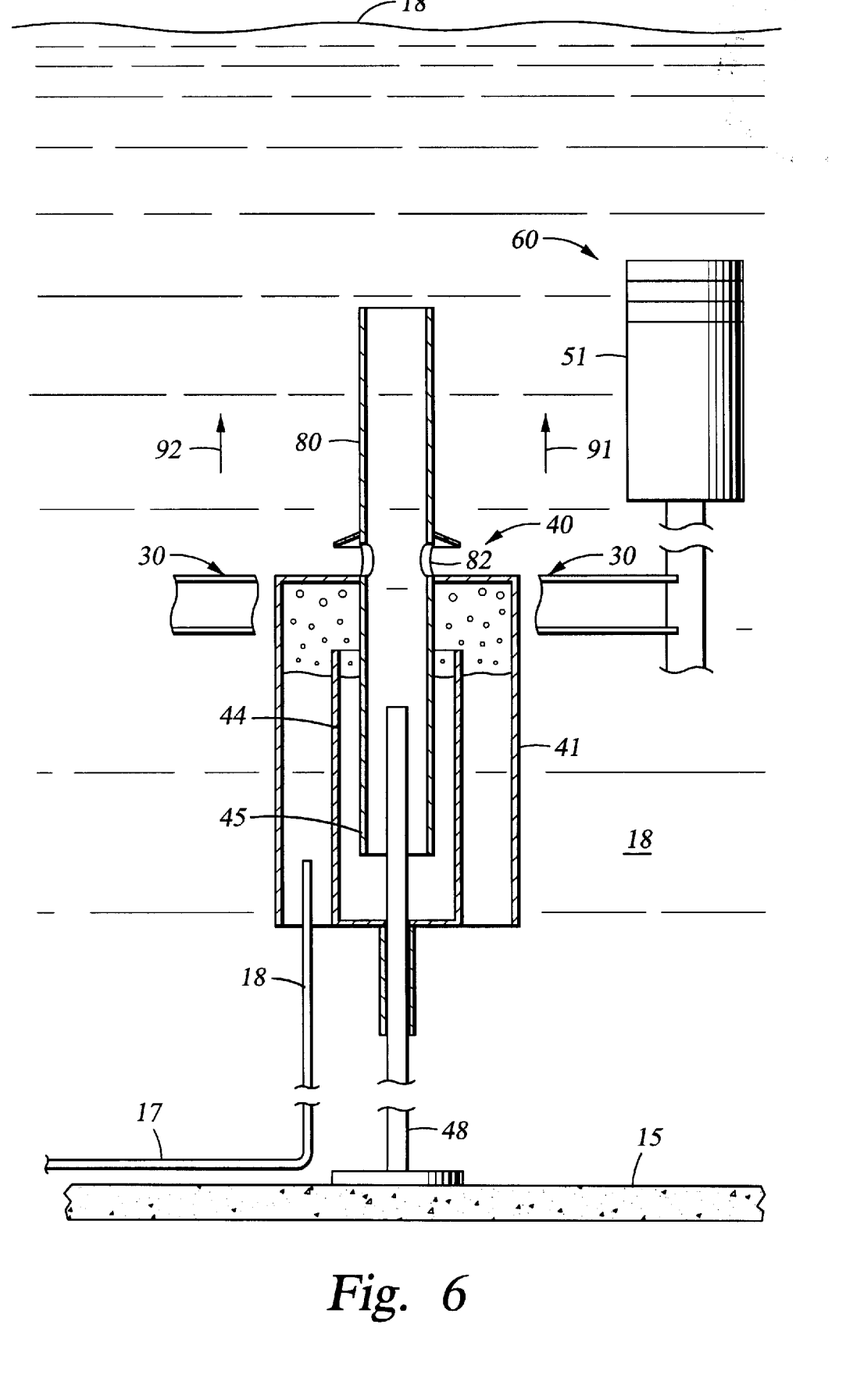

Referring to FIG. 6, the apparatus is shown in its lowermost position and as compressed air is introduced continuously into the first hollow cylinder 41, the compressed air begins to accumulate in the top portions of the first hollow cylinder 41 and the second hollow cylinder 44 thereby displacing liquid from these cylinder portions and thereby making the flotation and compressed gas discharge apparatus 40 increasingly buoyant and causing it to float upwardly in the liquid 18 contained in the flocculation basin 12 (FIG. 1). Due to the mounting of the flotation and compressed gas discharge apparatus 40 to the paddle apparatus 30 described above, the upward floating movement of the apparatus 40 provides upward movement to the paddle apparatus 30 as indicated by the arrows 91 and 92 in FIG. 6. This upward movement of the paddle apparatus 30 causes the paddle apparatus 30 to stir or agitate the liquid 18 thereby causing, or at least facilitating, the agglomeration of the particles suspended in the liquid 18.

Figure 7:
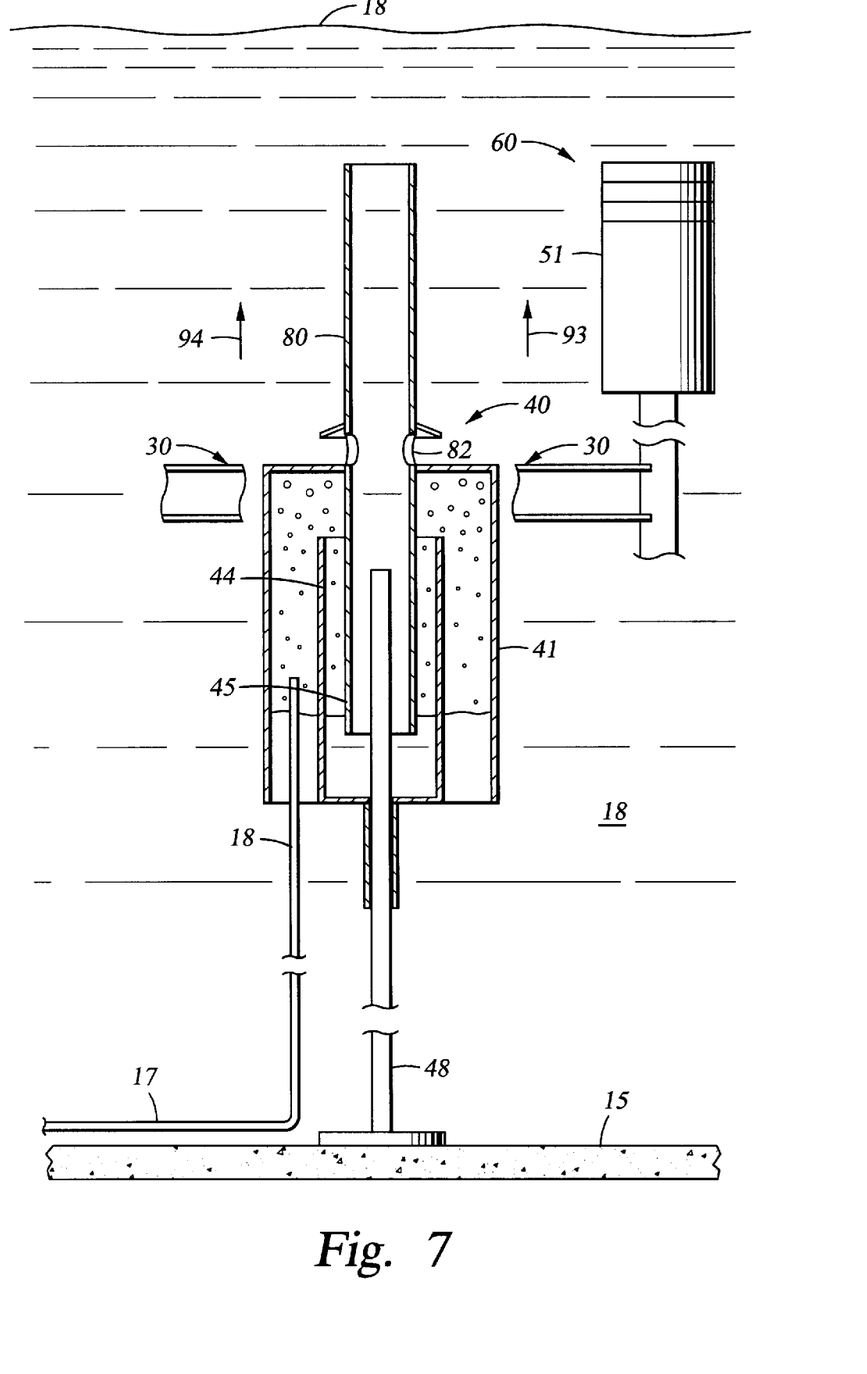

Referring to FIG. 7, due to the further accumulation of the compressed air in the first hollow cylinder 41 and the second hollow cylinder 44, and the continued displacement of liquid therefrom, the flotation and compressed gas discharge apparatus 40 has floated further upwardly thereby moving the paddle apparatus 30 further upwardly as indicated by the arrows 93 and 94 in FIG. 7. This further upward movement of the paddle apparatus 30 produces further agitation and stirring of the liquid 18 and further agglomeration of the particles suspended in the liquid 18.

Figure 8:
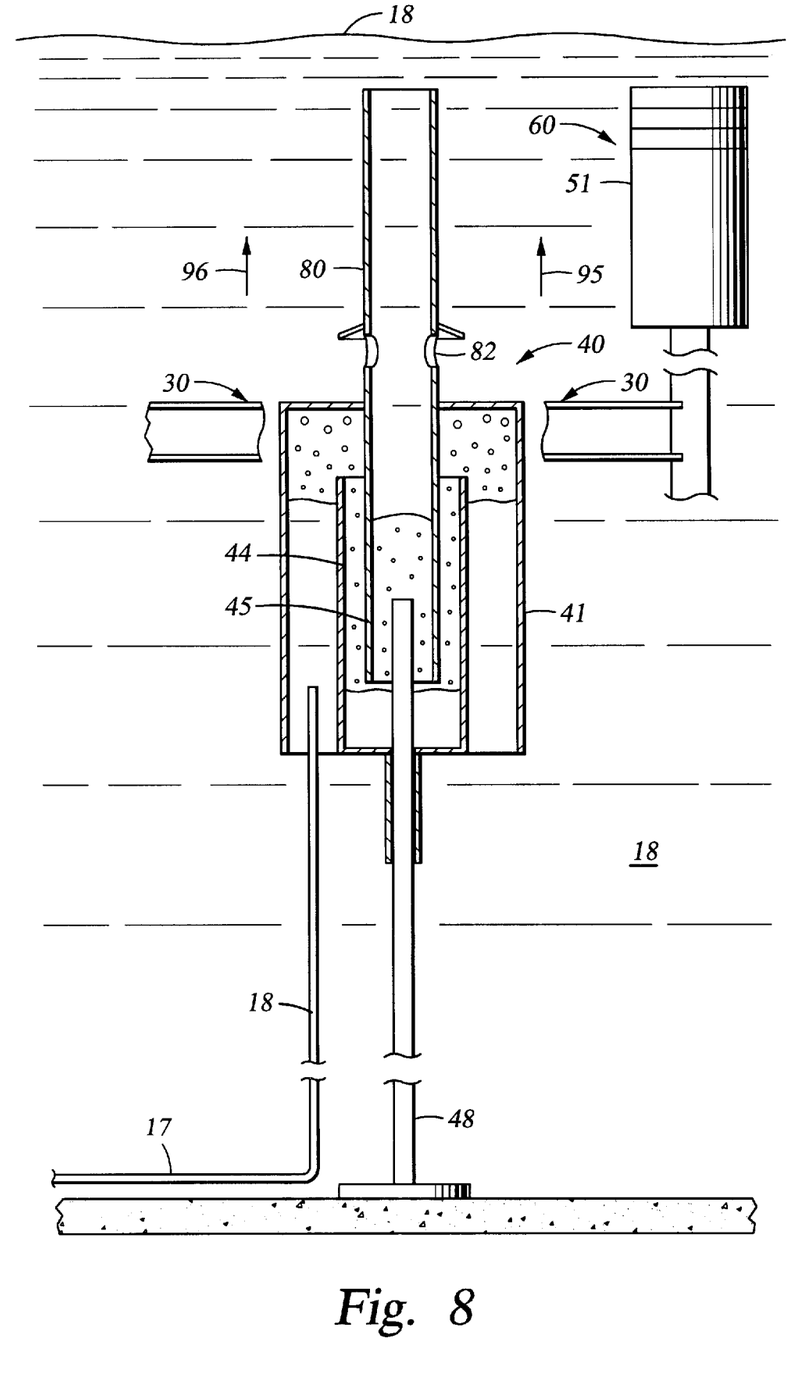

As illustrated in FIG. 8, the further accumulation of compressed air in the first hollow cylinder 41 and the second hollow cylinder 44 has provided further or increased buoyancy to the flotation and compressed gas discharge apparatus 40 floating such apparatus further upwardly in the liquid 18 and thereby moving the paddle apparatus 30 still further upwardly in the liquid 18 to further agitate and stir the liquid 18 and facilitate agglomeration of the particles suspended in the liquid, as indicated by the arrows 95 and 96 in FIG. 8. It will be understood from FIG. 8 that the compressed air has begun to enter the third hollow cylinder 45 and move upwardly therein.

Figure 9:
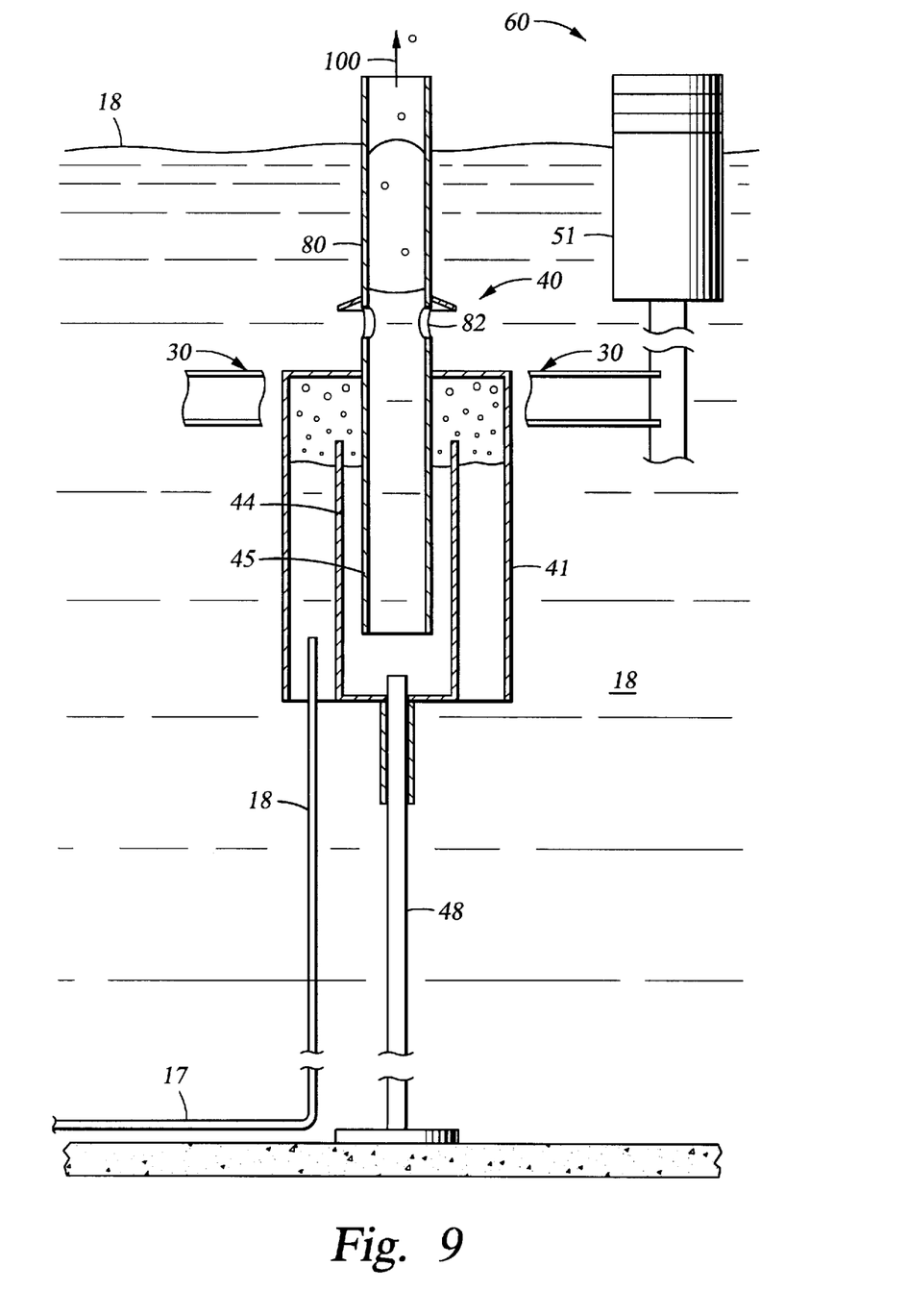

Referring to FIG. 9, upon the further accumulation of compressed air in the flotation and compressed gas discharge apparatus 40, the apparatus has become further increasingly buoyant and has floated further upward and moved the paddle apparatus 30 further upward in the liquid to further agitate and stir the liquid and further cause agglomeration of the particles suspended in the liquid. However, at this stage in the flotation cycle, it will be noted that a substantial portion of the pressurized air has entered the gas discharge pipe 80 and will be discharged to the atmosphere, or ambient air, as illustrated by the arrow 100 in FIG. 9. Upon this discharge of the compressed air, liquid 18 enters the flotation and compressed gas discharge apparatus 40 through the bottom opening between the hollow cylinder 41 and the hollow cylinder 44 causing the flotation and compressed gas discharge apparatus 40 to become immediately heavier and begin to sink or move downwardly in the liquid 18 under the influence of gravity which pulls the paddle apparatus 30 downwardly in the liquid 18 to the initial position shown in FIG. 6 during which time the paddle apparatus 30 further agitates or stirs the liquid 18 to further facilitate the agglomeration of the particles suspended in the liquid 18.

Referring again to FIG. 9, it will be understood that the majority of the compressed air accumulated in the flotation and compressed gas discharge apparatus 40 is discharged from such apparatus and it will be further understood that the second hollow cylinder 44 and the third hollow cylinder 45 function as a siphon and may be considered to be an inverted siphon mounted interiorly of the first hollow cylinder 41. It will be further understood from FIG. 9 that the compressed gas discharge pipe 80 functions as a baffle preventing excessive turbulence of the liquid 18 which could be created were the compressed gas discharged from the apparatus 40 to be discharged into the liquid 18.

It will be further understood that the flotation, or rise rate of the flotation and compressed gas discharge apparatus 40, and the paddles 30, and the number of cycles of flotation and downward movement under the influence of gravity can be adjusted by controlling the rate of flow of the compressed air into the apparatus 40.

Figure 10:
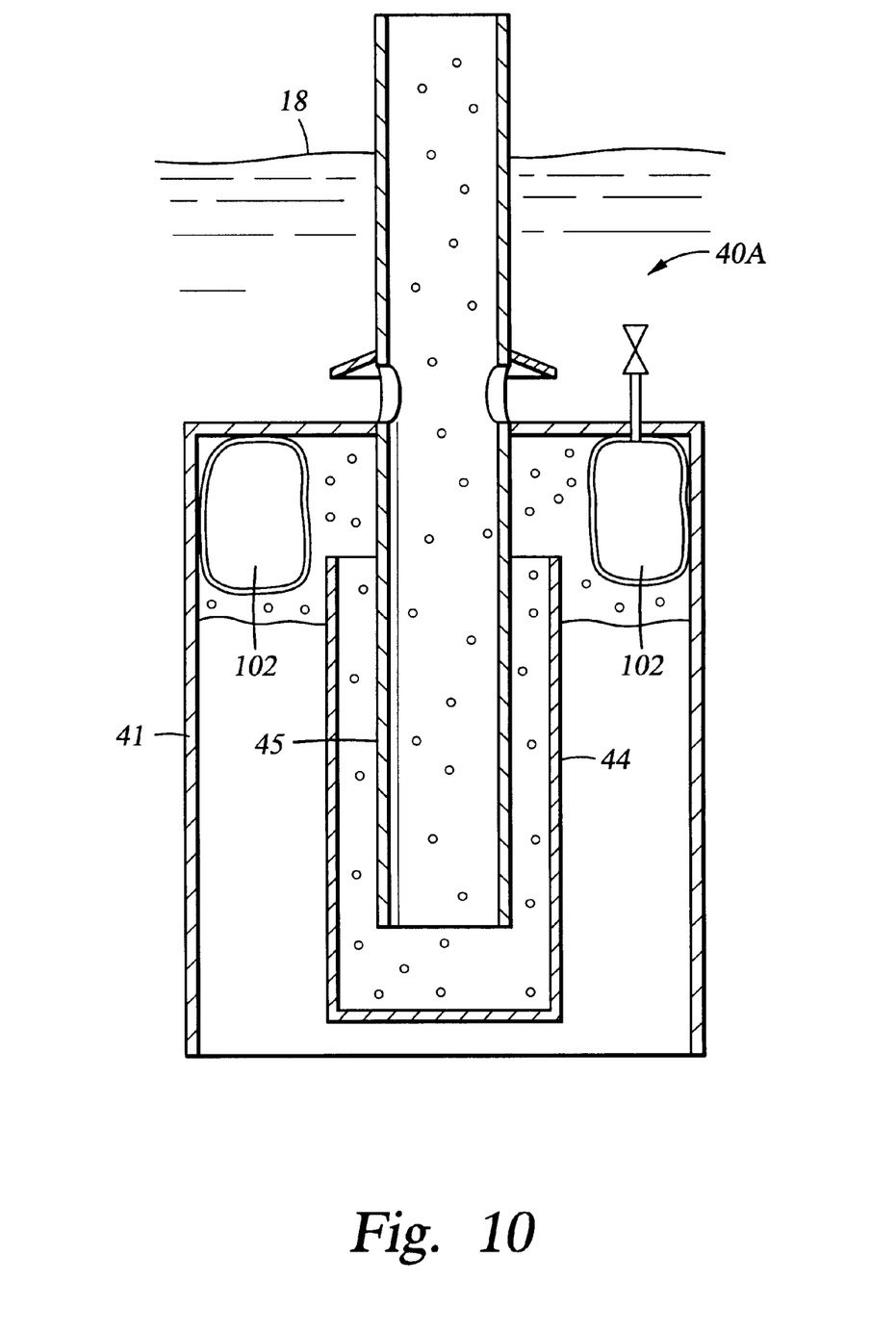
FIG. 10 is a generally vertical diametrical and cross-sectional illustration of a still further alternate embodiment of the flotation and gas discharge apparatus of the present invention.

Referring now to FIG. 10, an alternate embodiment of the flotation and compressed gas discharge apparatus is illustrated and identified by general numerical designation 40A. This embodiment is substantially the same as the embodiment 40 described above but differs in that this embodiment includes an annular bag or container 102 of, for example, air or water contained in a suitable plastic container or membrane and which adjusts the volume of the outer hollow cylinder 41 thereby adjusting the amount of compressed air that can accumulate in the flotation and compressed gas discharge apparatus 40A.

Figure 11:
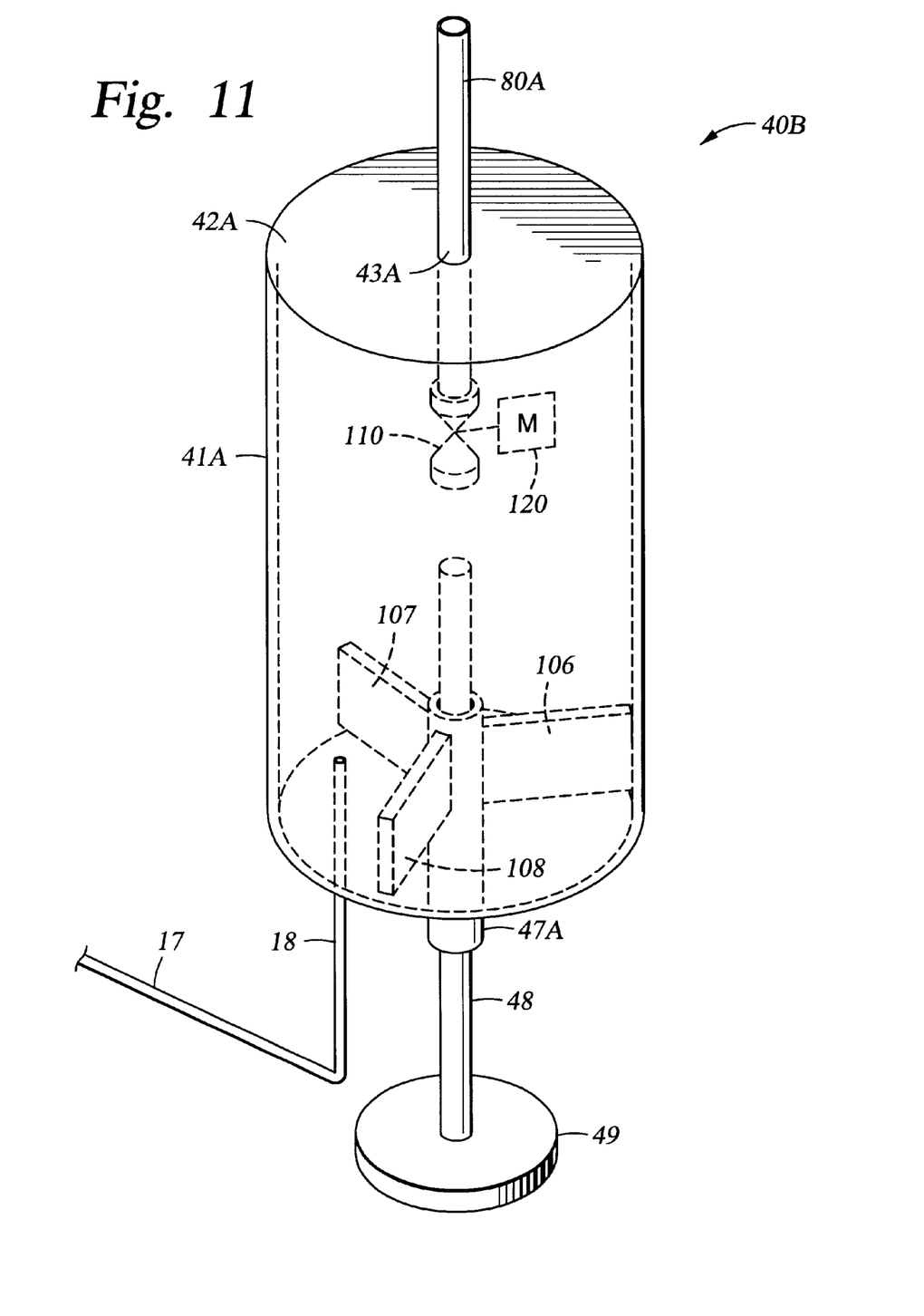
FIG. 11 is a perspective view of a still further embodiment of the flotation and gas discharge apparatus of the present invention.

A still further embodiment of flotation and compressed gas discharge apparatus of the present invention is illustrated in FIG. 11 and identified by general numerical designation 40B. In this embodiment, a single hollow cylinder 41A is included and a gas discharge pipe 80A is mounted to and extends upwardly from the closed top 42A of the hollow cylinder 41, the gas discharge pipe 80A may be mounted to the cylinder top 42A such as by welding upon the members being made of stainless steel. The gas discharge pipe 80A is mounted to the cylinder top 42A, as shown in FIG. 1, surrounding or coincident with the centrally formed opening 43A provided in the cylinder top 42A. A guide rod slide 47A is mounted interiorly of the lower portion of the hollow cylinder 41A such as, for example, by a plurality of radially disposed support members 106, 107 and 108. In this embodiment, the accumulated compressed air is discharged from the hollow cylinder 41A by a valve indicated by general numerical designation 110. The valve 110 is mounted suitably interiorly of the hollow cylinder 41A, as illustrated diagrammatically in FIG. 11, and is in fluid communication with the compressed air discharge pipe 80A through the opening 43A formed in the cylinder top 42A. The valve 110 is normally closed to permit the compressed air introduced into the hollow cylinder 41A by the compressed air line 18 to accumulate in the hollow cylinder 41A and perform the flotation cycle illustrated in FIGS. 6 and 9. Upon the flotation and compressed gas discharge apparatus 40B reaching the uppermost position illustrated in FIG. 9, the valve 110 is operated and opened to discharge the compressed air accumulated in the hollow cylinder 41A and permit the apparatus 40B, and the paddle members 30, to sink downwardly in the liquid 18 (FIG. 1) in the same manner described above with regard to the embodiment illustrated in FIG. 9. The valve 110 may be a suitable mechanical or air operated air release valve of the type known to the art and may be actuated by a suitable limit switch, pressure switch, timer or other means indicated diagrammatically in FIG. 11 by numerical designation 120.

It will be understood by those skilled in the art that many variations and modifications may be made in the present invention without departing from the spirit and the scope thereof.

What is claimed is:

1. Flocculation apparatus for residing in a flocculation basin containing a liquid in which flocculatable particles are suspended, comprising:
    paddle means for being moved upwardly and downwardly through the liquid to stir the liquid and facilitate agglomeration of the particles, said paddle means including a plurality of longitudinally extending, horizontally disposed and laterally spaced apart paddle members;
    flotation means for floating said paddle means upwardly through the liquid in response to the receipt therein of compressed gas;
    compressed gas discharge means for discharging the compressed gas received in said flotation means to allow gravity to pull said paddle means downwardly through the liquid; and
    compressed gas introduction means for introducing the compressed gas into said flotation means.

2. Apparatus according to claim 1, wherein said apparatus further comprises guide means, said paddle means mounted slidably to said guide means for sliding upward and downward movement with respect thereto, said guide means for locating paddle means in said flocculation basin.

3. Apparatus according to claim 1, wherein said paddle means are made of a material having a buoyancy characteristic and wherein said apparatus further comprises ballast means for varying the buoyancy of said paddle means in accordance with said buoyancy characteristic.

4. Apparatus according to claim 3, wherein said apparatus further comprises trim means from maintaining said paddle means substantially horizontal upon said paddle means moving upwardly and downwardly through the liquid.

5. Apparatus according to claim 1, wherein said flotation means comprises a hollow cylinder having an open bottom and a generally closed top and for receiving the compressed gas.

6. The apparatus according to claim 5, wherein said compressed gas discharge means comprises inverted siphon means.

7. The apparatus according to claim 5, wherein said generally closed top of said hollow cylinder is provided with a generally centrally formed cylinder opening, wherein said apparatus further comprises a compressed gas discharge pipe extending upwardly from said hollow cylinder and including a lower portion mounted to said generally closed top of said hollow cylinder coincident with said cylinder opening and said lower portion of said discharge pipe including at least one pipe opening for placing the exterior of said hollow cylinder in fluid communication with the interior of said hollow cylinder through said cylinder opening, and said apparatus further comprising valve means mounted in said hollow cylinder and operatively associated with said cylinder opening and for being opened to discharge the compressed gas contained in said hollow cylinder through said discharge pipe.

8. Apparatus according to claim 5, wherein said hollow cylinder comprises a first hollow cylinder, wherein said generally closed top of said first hollow cylinder is provided with a generally centrally formed opening, wherein said first hollow cylinder has a first width, wherein said compressed gas discharge means comprises a second hollow cylinder and a third hollow cylinder, said second hollow cylinder residing interiorly of, spaced inwardly from, and mounted to said first hollow cylinder, said second hollow cylinder having a generally closed bottom, an open top portion placing the interior of said second hollow cylinder in fluid communication with the interior of said first hollow cylinder, and said second hollow cylinder having a second width smaller than said first width, said third hollow cylinder residing interiorly of and spaced inwardly from said second hollow cylinder, said third hollow cylinder having an open bottom spaced upwardly from said closed bottom of said second hollow cylinder and placing the interior of said third hollow cylinder in fluid communication with the interior of said second hollow cylinder, said third hollow cylinder having an open top coincident with said opening formed in said generally closed top of said first hollow cylinder and having an upper portion mounted to said generally closed top of said first hollow cylinder, and said-third hollow cylinder having a third width smaller than said second width; and
    wherein said apparatus further comprises a compressed gas discharge pipe extending upwardly from said first hollow cylinder and aligned axially with said third hollow cylinder, said discharge pipe including a lower portion mounted to said generally closed top of said first hollow cylinder coincident with said opening formed in said top of said first hollow cylinder to place the interior of said compressed gas discharge pipe in fluid communication with the interior of said third hollow cylinder, said lower portion of said compressed gas discharge pipe provided with at least one opening for placing the exterior of said first hollow cylinder in fluid communication with the interiors of said third hollow cylinder, said second hollow cylinder, and said first hollow cylinder.

9. The apparatus according to claim 8 wherein said first hollow cylinder has a first height and wherein said second hollow cylinder has a second height smaller than said first height and wherein said third hollow cylinder has a third height smaller than said first height.

10. The apparatus according to claim 8, wherein the flotation basin includes walls providing at least in part a chamber containing the liquid, and wherein said apparatus further comprises frame means and guide means, wherein said paddle means are mounted on said frame means and wherein said frame means are mounted on said guide means for upward and downward movement through the liquid, and wherein said guide means are for preventing said paddle means and said frame means from engaging the walls of the flocculation basin during the upward and downward movement of said paddle means and said frame means.

11. The apparatus according to claim 8, wherein the flotation basin includes walls and a basin bottom, wherein said apparatus further comprises frame means and wherein said paddle means are mounted on said frame means, and wherein said generally closed bottom of said second hollow cylinder is provided with a generally centrally formed second cylinder opening, and wherein said apparatus further comprises a guide rod mounted to and extending upwardly from the basin bottom and wherein said guide rod is received slidably within said second cylinder opening to position said flocculation apparatus in the flocculation basin during said upward and downward movement of said paddle means through the liquid and to prevent said frame means and said paddle means from engaging the walls of the flocculation basin during upward and downward movement of said paddle means and said frame means.

12. The apparatus according to claim 8, wherein said first hollow cylinder, said second hollow cylinder, said third hollow cylinder and said gas discharge pipe are circular in horizontal cross-section.

13. The apparatus according to claim 8, wherein said first hollow cylinder and said second hollow cylinder are rectangular in horizontal cross-section and wherein said third hollow cylinder and said gas discharge pipe are circular in horizontal cross-section.

14. The apparatus according to claim 1, wherein said apparatus further comprises heating means for heating said paddle means.

15. The apparatus according to claim 1, wherein said floatation means are mounted to said paddle means.

16. Flocculation apparatus, comprising:
paddle means for being moved upwardly and downwardly through a liquid in which particles are suspended to facilitate agglomeration of the particles, said paddle means including a plurality of longitudinally extending, horizontally disposed and laterally spaced apart paddle members;
flotation means and compressed gas discharge means for alternately and continuously moving said paddle means upwardly and downwardly through the liquid in response to compressed gas being introduced continuously into said flotation means, said flotation means for continuously receiving the compressed gas therein and in response thereto for floating and moving the paddle means upwardly through the liquid and after which said compressed gas discharge means are for discharging the compressed gas from the flotation means to allow gravity to pull the paddle means downwardly through the liquid; and
compressed gas supply means for continuously introducing the compressed gas into said flotation means.

17. Flocculation apparatus for residing in a flocculation basin including walls providing a chamber containing liquid in which particles are suspended, comprising:
paddle means;
frame means;
said paddle means mounted to said frame means and including a plurality of longitudinally extending, horizontally disposed and laterally spaced apart paddle members;
flotation means mounted to said paddle means, said flotation means for floating and moving said paddle means and said frame means upwardly through the liquid in response to said flotation means continuously receiving compressed gas introduced therein;

compressed gas supply means for introducing compressed gas into said flotation means;
compressed gas discharge means operably associated with said flotation means for discharging the compressed gas from said flotation means to allow gravity to pull said paddle means downwardly through the liquid;
guide means operably associated with said paddle means and said frame means and for preventing said paddle means and said frame means from engaging the walls of the flocculation basin during said upward and downward movement of said paddle means and said frame means; and
upon said paddle means moving upwardly and downwardly through the liquid said paddle means agitating the liquid to facilitate agglomeration of the particles.

18. The flocculation apparatus according to claim 17 wherein said paddle means are made from material having a buoyancy characteristic, and wherein said apparatus further comprises ballast means mounted to said frame means for varying the buoyancy of said paddle means in accordance with said buoyancy characteristic.

19. The flocculation apparatus according to claim 17 wherein said paddle means comprise first paddle means and second paddle displaced downwardly from said first paddle means.

20. The flocculation apparatus according to claim 19 wherein each of said paddle means comprise a plurality of horizontally disposed, longitudinally extending and laterally spaced apart paddle members mounted to said frame means.

21. The flocculation apparatus according to claim 20 wherein said paddle members are generally U-shaped or rectangular in transverse cross-section.

22. The apparatus according to claim 17 wherein said apparatus further includes trim means for maintaining said paddle means and said frame means substantially horizontal as said paddle means move upwardly and downwardly through the liquid.

23. Flocculation apparatus for residing in a chamber containing liquid in which flocculatable or settleable particles are suspended, said flocculator apparatus for stirring the liquid to facilitate flocculation of the particles, said flocculation apparatus comprising:
liquid stirring means including a plurality of longitudinally extending, horizontally disposed and laterally spaced apart paddle members; and
combination flotation and compressed gas discharge means mounted to said liquid stirring means, said combination flotation and compressed gas discharge means for receiving compressed gas and in response to sufficient compressed gas being received therein said combination flotation and compressed gas discharge means becoming sufficiently buoyant to float said liquid stirring means upwardly in said chamber to cause said liquid stirring means to stir the liquid and upon said combination flotation and compressed gas discharge means floating sufficiently high in said liquid said combination flotation and compressed gas discharge means automatically discharging sufficient of the compressed gas received therein to cause said combination flotation and compressed gas discharge means to lose sufficient buoyancy to permit gravity to pull said stirring means downwardly in said chamber to cause said stirring means to stir said liquid and said combination flotation and gas discharge means for repeatedly alternately floating said stirring means upwardly in said chamber and permitting gravity to pull said stirring means downwardly in said chamber in response to compressed gas received in and automatically discharged from said combination flotation and compressed gas discharge means.

24. Apparatus for floating upwardly in a liquid and for moving downwardly in the liquid under the influence of gravity said apparatus comprising:

combination floatation and compressed gas discharge means for receiving compressed gas and in response to sufficient floatation said combination compressed gas discharge means becoming sufficiently buoyant to float upwardly in the liquid and upon-said combination flotation and compressed gas discharge means floating sufficiently high in the liquid said combination flotation and compressed gas discharge means automatically discharging sufficient of the compressed gas received therein to cause said combination flotation and compressed gas discharge means to lose sufficient buoyancy to permit gravity to pull said combination flotation and compressed gas discharge means downwardly in the liquid and said combination flotation and gas discharge means for repeatedly alternately floating upwardly in the liquid and permitting gravity to pull said combination flotation and compressed gas discharge means downwardly in the liquid in response to compressed gas received in and automatically discharged from said combination flotation and compressed gas discharge means, said combination floatation and compressed gas discharge means comprising a first hollow cylinder having an open bottom and a generally closed top provided with a generally centrally formed opening, said first hollow cylinder has a first height and a first width, a second hollow cylinder and a third hollow cylinder, said second hollow cylinder residing interiorly of, spaced inwardly from, and mounted to said first hollow cylinder, said second hollow cylinder having a generally closed bottom, an open top portion placing the interior of said second hollow cylinder in fluid communication with the interior of said first hollow cylinder, and said second hollow cylinder having a second height and a second width smaller than said first height and said first width, said third hollow cylinder residing interiorly of and spaced inwardly from said second hollow cylinder, said third hollow cylinder having an open bottom spaced upwardly from said closed bottom of said second hollow cylinder and placing the interior of said third hollow cylinder in fluid communication with the interior of said second hollow cylinder, said third hollow cylinder having an open top coincident with said opening formed in said generally closed top of said first hollow cylinder and having an upper portion mounted to said generally closed top of said first hollow cylinder, and said third hollow cylinder having a third width smaller than said second width.

25. The apparatus according to claim 24 wherein said apparatus further comprises a compressed gas discharge pipe extending upwardly from said first hollow cylinder and aligned axially with said third hollow cylinder, said discharge pipe including a lower portion mounted to said generally closed top of said first hollow cylinder coincident with said opening formed in said top of said first hollow cylinder, said lower portion of said compressed gas discharge pipe including at least one opening for placing the exterior of said first hollow cylinder in fluid communication with the interior of said third hollow cylinder and thereby in fluid communication with the interiors of said second hollow cylinder and said first hollow cylinder.

\* \* \* \* \*